United States Patent
Lühmann et al.

(10) Patent No.: US 7,101,615 B2
(45) Date of Patent: *Sep. 5, 2006

(54) DOUBLE-SIDED ADHESIVE TAPE AND ITS USE

(75) Inventors: Bernd Lühmann, Norderstedt (DE); Andreas Junghans, Hamburg (DE); Ulrich Otten, Hamburg (DE)

(73) Assignee: Tesa AG, Hamburg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 709 days.

(21) Appl. No.: 09/073,509

(22) Filed: May 6, 1998

(65) Prior Publication Data

US 2002/0034628 A1 Mar. 21, 2002

(30) Foreign Application Priority Data

May 14, 1997 (DE) .......................................... 197 20 145

(51) Int. Cl.
*C09J 7/02* (2006.01)

(52) U.S. Cl. .................... 428/317.3; 428/158; 428/343; 428/354; 428/355 BL

(58) Field of Classification Search ............. 428/317.3, 428/354, 158, 246, 343, 355 BL See application file for complete search history.

(56) References Cited

U.S. PATENT DOCUMENTS

| | | | | | |
|---|---|---|---|---|---|
| 5,516,581 | A | * | 5/1996 | Kreckel | 428/317.3 |
| 5,725,923 | A | * | 3/1998 | Luhmann | 428/40 |
| 5,989,708 | A | * | 11/1999 | Kreckel | 428/354 |
| 6,001,471 | A | * | 12/1999 | Bries | 428/343 |

FOREIGN PATENT DOCUMENTS

| | | | |
|---|---|---|---|
| DE | 3331016 | * | 6/1983 |
| EP | 0735121 | * | 2/1997 |
| WO | WO9211332 | * | 7/1992 |
| WO | WO9506691 | * | 3/1995 |

* cited by examiner

*Primary Examiner*—Daniel Zirker
(74) *Attorney, Agent, or Firm*—Norris Marcus & McLaughlin P.A.

(57) ABSTRACT

Double-sided adhesive tape (fixer) which can be re-released without residue or destruction for hidden bonding on substrates that are to be bonded, with high peel strength, high shear strength and high tip-shear strength, characterized by a) an intermediate support which cleaves under the action of torsional forces, lever forces and/or peel forces, b) pressure-sensitive adhesive composition coated on both sides of the intermediate support, which composition can be released without residue or destruction by stretching in the direction of the bond plane.

17 Claims, No Drawings

DOUBLE-SIDED ADHESIVE TAPE AND ITS USE

The invention relates to a double-sided adhesive tape for bonds which can be re-released without residue or destruction, and to its use.

Prior Art

Double-sided pressure-sensitive self-adhesive tapes are variously employed for the temporary and permanent bonding of a very wide variety of materials. An important advantage of such self-adhesive tapes is their ease of handling and the rapid realization of the adhesive bond. It is frequently disadvantageous that bonds produced accordingly cannot be re-released without residue and, in many cases, not without destruction.

Numerous adhesive systems have been developed which permit the production of reversibly peelable self-adhesive tapes. Typical examples of such products include:

Pressure-sensitive adhesive compositions based on acrylate copolymers prepared by suspension polymerization. Exemplary embodiments are described in WO 96/18701 "Removable pressure-sensitive adhesive and article" and the literature cited therein.

Self-adhesive tapes which are partially coated with pressure-sensitive adhesive composition and which acquire reversibly peelable properties by virtue of the partial coating. For exemplary embodiments see, for example, EP 0 149 135 "Sheetlike, pressure-sensitive adhesive articles which can be re-released without residue" and EP 0 328 925 "Sheetlike, pressure-sensitive adhesive articles".

Numerous further adhesive systems, for example those based on acrylate copolymers, natural rubber-resin mixtures, ethylene-vinyl acetate copolymers, to name but a few, have a profile of properties in terms of adhesive technology which can be controlled such as to permit the production of adhesive tapes with very low adhesive forces.

Typically, however, in terms of the bond strengths which can be realized, the abovementioned self-adhesive tapes exhibit only an extremely limited performance profile. The peel strengths and tip-shear strengths, in particular, are not very high.

tesa-Power-Strips® are obtainable commercially. DE 3.331.016 ("Adhesive film for re-releasable adhesive bonds"), WO 92/11333 // U.S. Pat. No. 5,516,581// EP 0 563 272 ("Removable adhesive tape") and WO 95/06691 "Strippable foam adhesive tape" describe different types of double-sided self-adhesive tapes which can be released from the bond joints, without residue or destruction, by stretching essentially parallel to the bond plane (in the plane of the bond). Bonds with corresponding self-adhesive tapes are possible in the same way as with conventional double-sided pressure-sensitive self-adhesive tapes, with the advantage that the bonds produced can be re-released at any time without residue or destruction, in many cases even from numerous highly sensitive substrates, such as coated woodchip wallpaper, for example. The bond strengths which are achievable can be adjusted within a wide range. A disadvantage of such adhesive tapes is that in order to release the adhesive bond it is necessary for part of the adhesive tape to project from the bond joint, this part being utilized as a grip tab for pulling the adhesive tape out of the bond joint. In many cases, however, it is undesirable for part of the self-adhesive tape to be visible; if, for example, the grip tabs project beyond the picture frame when a picture is being fixed. A further disadvantage is that the abovementioned self-adhesive tapes are required to possess a sufficiently high tear strength coupled with high extension, in order to allow reliable and convenient release by stretching essentially in the bond plane. This applies in particular to double-sided pressure-sensitive adhesive embodiments, since in this case the release of the adhesive bond without residue or destruction requires that the adhesive tape be released simultaneously from two bonded surfaces, which requires particularly high tear strengths of the adhesive tapes. The high tear strengths coupled with high extension are realized through the use of specific, particularly extensible and tear-resistant pressure-sensitive compositions or intermediate supports.

A number of ways have been described to employ the abovementioned self-adhesive tapes in such a way that, in use, the grip tab remains out of sight behind the bonded article, so that bonds with a hidden grip tab are possible. For instance, DE 4.233.872 ("Re-releasable self-adhesive hook") describes a re-releasable self-adhesive hook which leaves the grip tab hidden behind a removable tab of the hook body, Similar approaches have been taken in DE 195 11 288 ("Use of an adhesive film section for a bond which is re-releasable without residue or damage"), and by WO 94/21157 ("Article support using stretch releasing adhesive"). In all of the cases described above a bond in which the grip tab is to remain out of sight requires a highly specific apparatus which hides the grip tab in the course of application and makes it readily accessible for the release process. A hidden bond, therefore, is not a general and easy possibility.

DE 4.339.604 ("Use of an adhesive film strip for a re-releasable bond") describes specific self-adhesive tapes which can be re-released without residue or destruction and which in the bonded state are located entirely between the object that is to be bonded and the substrate, and which do not require a grip tab for release. In this case disbanding takes place by pulling the bonded article approximately parallel to the bond plane. Bonds produced in this way, therefore, offer the advantage that for the viewer of a bonded article the adhesive film remains completely out of sight behind the said article. A further advantage is that a large number of bonds can be produced, and that no specific devices or tools are necessary in order to produce the bond and to release it again. In practice, however, bonds produced in this way have the disadvantage that owing to the specific composition of the self-adhesive tapes they are suitable exclusively for bonds which permit only a limited shear load and, in particular, only an extremely limited tip-shear load. For many applications, therefore, it is not possible to use such self-adhesive tapes.

3M Scotch PSL 10 360, Scotch 4656 and Scotch 4658 F are double-sidedly re-releasable self-adhesive tapes based on plasticized pressure-sensitive acrylate copolymers, which are prized in particular for the temporary fixing of articles that are to be fastened. Re-releasability is possible by very slow peeling, rapid pulling and violent cleavage (levering).

A disadvantage of the abovementioned products is:

the high stress undergone by the substrates in the course of the peeling process and, in particular, when the bonded articles are levered off from the substrate. As a result of the high mechanical stress on re-release the products are unsuitable, in particular, for the bonding of low-strength materials, such as wallpapers, cardboards, numerous papers, plasterboard, numerous veneered wood surfaces, etc.

Under the name of fix-o-moll® Mega-Klebestrips the company Ritterath offers a double-sided pressure-sensitive self-adhesive tape with an intermediate foam support, which makes it possible to release adhesive bonds produced with this tape by the action of torsional forces (twisting). Subsequently, the adhesive-tape halves which have remained on the two bond surfaces can be released again from solid substrates without residue, starting from a non-adhesive grip tab region which is integrated in the adhesive tape, by peeling. Disadvantages of the abovementioned product are:

the complex product composition: the composition of the products used comprises five functional layers. An intermediate foam support allows the adhesive tape to be cleaved under the action of torsional forces which act in the bond plane on the double-sidedly bonded adhesive strips. Applied to both sides of the foam material is a polyolefin film which is coated with pressure-sensitive adhesive composition and which allows the adhesive tape halves which are present on the two substrate surfaces to be peeled off following the cleavage of the adhesive bond.

the re-release process by peeling from the substrates. Following the cleavage of the adhesive bond, Mega-Klebestrips are peeled from the substrate by torsion or twisting. Peeling of the adhesive tape, however, brings about damage to the substrate material in the case of low-strength substrates, such as coated woodchip wallpaper, many paper and card substrates, plasterboard, textured vinyl wallpapers, etc. For the realization of high bond strengths, experience has shown that high adhesive forces, i.e. peel strengths, are a necessary prerequisite at the same time for a sufficient product performance. It is precisely these, however, which rule out, or greatly restrict, the residueless removal of the adhesive strips from sensitive substrates and also numerous substrates which are supposedly of adequate strength.

Following the twisting-off of the adhesive strips, the foam material in the grip tab region of the fix-o-moll® Mega-Klebestrips, which is brought about by laminating a plastics film onto one end of the adhesive strips on both sides, has usually not been torn apart, since owing to the lack of bonding of the said foam material to the substrates it is not possible for any sufficient torsional forces to act in the course of twisting removal. If, subsequently, the article to be released is detached vertically from the bond substrate, the peel forces which act cleave low-strength substrates, which may be damaged or even destroyed.

The aim of the present invention was to overcome the abovementioned disadvantages and, in particular, to present self-adhesive tapes which:

are suitable for bonds which are re-releasable without residue or destruction, and at the same time remain hidden behind the bonded article in the application state and hence permit an "invisible" bond;

in particular do not necessitate any special devices on the article that is to be bonded, for a hidden bond;

permit powerful bonds which have not only very high peel strengths but also very high shear and tip-shear strengths;

allow residueless re-release even from sensitive substrates such as coated woodchip wallpaper, for example; and possess a simple product structure, the profile of properties of adhesive tapes according to the invention being controllable within wide ranges.

This is achieved by means of adhesive tapes as characterized further in the claims and, in particular, through the use of self-adhesive compositions which are re-releasable without residue or destruction by stretching essentially in the bond plane, in combination with an intermediate support which cleaves under the action of torsional and/or lever forces and/or peel forces. By twisting off, by levering or by peeling, the adhesive bond is released in a first step in such a way that cleavage of the foam is brought about and the adhesive tape cleaves into two parts. Subsequently, both on the bonded article and on the substrate respectively, there remains the pressure-sensitive adhesive composition originally applied to the respective substrate respectively, with residues of the destroyed intermediate support. Both adhesive tape halves can subsequently be released from the substrate without residue or destruction by stretching essentially in the bond plane. The foam materials which can be used for self-adhesive tapes according to the invention can be chosen from a broad range of commercial grades.

A further advantage of this arrangement is that, in the course of peeling or levering, even bonds to nonplanar substrates can be released.

Corresponding self-adhesive tapes lend themselves outstandingly to use for the residuelessly and non-destructively re-releasable bonding of hooks, pictures, postcards, calendars, decorations, notices, etc. which have been treated with them, even from sensitive substrates. They can likewise be employed with outstanding effect in connection with diverse long- and short-term bonds for industrial applications where the bonded articles are to be separated from one another again at a later point in time, without residue and/or destruction, in order, for example, to allow recycling or some other re-use of the adherends.

Another advantage is that, in accordance with the invention, it is possible to use relatively long adhesive tape sections which it would not be possible to employ for "classical" stripping removal because of their considerable extended length which results in the course of stripping. It is consequently possible in accordance with the invention to achieve higher bond strengths than was previously the case.

DETAILED DESCRIPTION

Materials Employed

Pressure-sensitive Adhesive Compositions

The pressure-sensitive adhesive compositions used are preferably those based on block copolymers comprising polymer blocks formed from vinylaromatic compounds (A blocks), preferably styrene, and those formed by polymerization of 1,3-dienes (D blocks), preferably butadiene and isoprene. Both homo- and copolymer blocks can be used in accordance with the invention. Resulting block copolymers may contain identical or different D blocks, which can be partly, selectively or completely hydrogenated. Block copolymers can have a linear A-D-A structure. It is also possible to employ block copolymers of radial design, and star-shaped and linear multiblock copolymers. Further components present can be A-D diblock copolymers. Block copolymers can be modified, for example functionalized by reaction with maleic anhydride. Block copolymers of vinylaromatic compounds and isobutylene can likewise be employed in accordance with the invention. All of the abovementioned polymers can be used alone or in a mixture with one another. Typical use concentrations for the styrene block copolymers are in the range between 15% by weight and 75% by weight, preferably in the range between 30% by weight and 60% by weight and, with particular preference, in the range between 35% by weight and 55% by weight.

Particularly suitable tackifiers include: rosin and its derivatives, aliphatic, aromatic-modified aliphatic, aromatic and phenol-modified tackifier resins, to name but a few. The concentrations in which the resins are employed are typically in the range between 15% by weight and 75% by weight, preferably in the range between 30% by weight and 65% by weight and, with particular preference, in the range between 35% by weight and 60% by weight.

As endblock-compatible resins (resins compatible primarily with the vinylaromatic blocks) it is possible to use homo- and copolymers of vinylaromatic compounds, such as styrene or α-methylstyrene, polyphenylene oxides, or else phenylene oxide-modified resins.

Further optimum blend components comprise plasticizer oils and liquid resins (use concentrations between 0 and max. about 35% by weight), fillers (reinforcing and non-reinforcing), e.g. silica, especially synthetic silica, glass (ground or in the form of beads), aluminas, zinc oxides, calcium carbonates, titanium dioxides, carbon blacks, to name but a few, anti-ageing agents (primary and secondary antioxidants, light stabilizers, antiozonants, metal passivators, etc.). Blend components likewise comprise polymers which exert an effect, in particular, on the ozone resistance of the block copolymers, examples being polyvinyl acetates and ethylene-vinyl acetate copolymers.

Other polymers which can be present are natural and synthetic polymers such as, for example, natural rubber, synthetic polyisoprenes, polybutadienes, polychloroprenes, SBR, Kraton Liquid (Shell Chemicals), polyisobutylenes, etc., which can replace up to about 50% by weight of the vinylaromatic-containing block copolymers.

The self-adhesive compositions used in accordance with the invention can be crosslinked chemically, especially by radiation-chemical means (e.g. by UV irradiation, γ irradiation or by irradiation with fast electrons).

Adhesive compositions according to the invention are, optionally, those whose tackiness is brought about only by thermal activation.

In addition to the self-adhesive compositions described above which are based on vinylaromatic-containing block copolymers, other suitable self-adhesive compositions are those which have sufficient tear strength and cohesion for the release process.

Corresponding pressure-sensitive adhesive compositions can be employed alone or in combination with those based on vinylaromatic-containing block copolymers. Examples of compounds suitable in accordance with the invention are pressure-sensitive adhesive acrylate copolymers copolymerized with macromonomers, the macromonomers having a glass transition temperature of >+40° C. The high tear strength of such copolymers is probably achieved by the association of the macromonomers. Examples of suitable macromonomers are methacryloyl-terminated polymethyl methacrylates.

Further suitable pressure-sensitive adhesive compositions, together with extensible film backings or the like, are those in accordance with WO 9211332 and WO 9211333, but also WO 9506691 and WO 9707172, which are expressly incorporated by reference. The products described therein, together with a cleavable intermediate support according to the invention, are likewise suitable for the purpose of the present invention.

Intermediate Supports Which Cleave Under the Action of Torsional and/or Lever Forces and/or Peel Forces Suitable intermediate supports which cleave under the action of torsional and/or lever forces and/or peel forces include foam-containing backing materials (intermediate foam supports), especially homo- and copolymers of ethylene, especially low and very low density polyethylenes (LDPE, LLDPE, VLDPE), ethylenevinyl acetate copolymers, and mixtures of the abovementioned polymers. Further possible polymers are: polyvinyl acetates, polypropylenes, polyurethanes based on aromatic and aliphatic diisocyanates, polystyrene, impact-modified polystyrenes, PVC, acrylate copolymers. Foam materials can be employed in crosslinked or uncrosslinked form.

The thicknesses of the foam materials employed are, in particular, between 175 µm and 10 mm, preferably between 250 µm and 5 mm and, with particular preference, between 350 µm and 3 mm. Densities are from 20 to 400 kg/m$^3$, preferably from 25 to 250 kg/m$^3$ and, with particular preference, from 25 to 150 kg/M$^3$. The foam can have a closed-cell, open-cell or mixed-cell structure. It is possible to use foams with or without a skin and of integral or non-integral structure. In accordance with the invention it is likewise possible to employ laminates of two or more foam materials.

Anchoring of the Pressure-sensitive Adhesive Compositions

To produce a sufficient anchorage of the pressure-sensitive adhesive compositions that are employed to the foam materials, the latter are advantageously subjected to a pressure pretreatment in the course of production and/or prior to their coating with pressure-sensitive adhesive. Suitable pretreatment processes include fluorine pretreatment, corona pretreatment, plasma pretreatment and flame pretreatment, the latter in particular by means of an electrically polarized flame. Pretreatment methods can be employed on their own or in combination. In the case of foams with a skin and integral foams, the foam can be primed in order to improve still further the anchorage of the adhesive composition.

Open-cell and mixed-cell foams can be subjected to impregnation. Between the foam material and the pressure-sensitive adhesive compositions it is possible, optionally, to integrate a barrier layer in order to reduce the passage of migratable materials between pressure-sensitive adhesive compositions and foam material.

Pretreatment of the Foams

To modify the forces required to cleave the adhesive bond by twisting, levering or peeling, the foam-containing intermediate supports of self-adhesive tapes according to the invention can be subjected to a pretreatment/damaging by means, for example, of perforation, cutting or punching. This pretreatment can be carried out before or after the first coating with pressure-sensitive adhesive composition. The results of the pretreatment are, in particular, incisions in the foam material, which reduce the mechanical strength of the backing in the direction of the plane in which the self-adhesive tapes produced using these backings will later be released by twisting, cleaving or peeling. In this way it is possible to control the release forces in a targeted manner. Examples of appropriate pretreatments are: incisions, punchings and perforations. These may cover the total area of the foam-containing backings uniformly, or can be present only in limited regions. They may have a regular structure or sequence or may be irregular. Incisions can be made vertical to the surface of the foam material or at defined other angles thereto. Incisions may go either all or only part-way through the foam-containing backing. They can be made in one or both sides of the foam-containing backing.

Self-adhesive Tapes

Self-adhesive tapes according to the invention comprise at least one foam-containing intermediate support which is equipped on both sides with a pressure-sensitive adhesive composition. The adhesive tapes cleave cohesively following the action of a corresponding torsional, lever or peel force (cleaving of the dhesive bond by twisting, levering or peeling). The dhesive composition used is of sufficient elongation at break and tear strength, so that the residues of adhesive tape which have remained on the substrates following the cleavage of the adhesive bond can be released again from these substrates, without residue or destruction, by stretching essentially in the bond plane. Pressure-sensitive adhesive compositions can be identical or different in formulation, and can be applied with an identical or different amount on both sides of the adhesive tape. Adhesive compositions can be composed of one or more layers of adhesive composition. For example, an adhesive layer can consist of two strata both of which use vinylaromatic-containing block copolymers as polymer base but where the block copolymers are the same or different. In addition, an adhesive layer based on rubbers, such as natural rubber or polybutadiene or polyisobutylene or "Kraton Liquid" (Shell Chemicals), or mixtures of the abovementioned polymers, can be applied to a first adhesive layer comprising vinylaromatic-containing block copolymers. The bond strength of self-adhesive tapes according to the invention to substrates which are suitable for the intended application is sufficiently high that there is essentially no adhesive separation of the adhesive tape when the adhesive bond is released by torsion, peeling or cleavage from the substrate.

Pressure-sensitive adhesive compositions are characterized in that their elongations at break are, in particular, greater than 200%, preferably greater than 350% and, with particular preference, greater than 450%.

Tear strengths of the pressure-sensitive adhesive compositions used are greater than 1.5 MPa, preferably greater than 3 MPa and, with particular preference, greater than 5 MPa.

Layer thicknesses of the pressure-sensitive adhesive compositions which determine the tear strength are, in particular $\geq$ about 75 µm, preferably >100 µm and, with particular preference, >150 µm.

The ratio of tear strength to stripping force of the self-adhesive tapes at peel angles of <10° relative to the bond surface is greater than 1.2:1, preferably greater than 1.5:1 and, with particular preference, greater than 2:1.

Presentation Form

Presentation forms of adhesive tapes according to the invention include both rolls of adhesive tape and sections of adhesive tape with defined dimensions, in the form, for example, of punched sections. Adhesive tape sections of defined dimensions may optionally have a shaped end in accordance with DE 4.428.587, for instance an end which runs to a point. In order to facilitate the process of release the adhesive strips may possess one or more regions which are devoid of pressure-sensitive adhesion and which serve as a gripping aid for releasing the adhesive strips after the cleavage of the adhesive bond. Grip tabs can be realized, for example, in accordance with DE 4.431.941 by laminating a release-coated grip tab film or a release-coated release paper onto the surface of the pressure-sensitive adhesive composition. Alternatively, the surface of the adhesive composition can be rendered inert by masking it with thin films comprising plastic, for example, or by masking it with thin papers, or else by coating or printing of the areas of pressure-sensitive adhesive composition which are to be rendered inert, or by applying a pulverulent material devoid of pressure-sensitive adhesion.

Typical grip-tab forms include regions devoid of pressure-sensitive adhesion on one or both sides, which are integrated into the marginal region of the adhesive strips. In the case of rectangular punched forms, these regions are preferably realized at the short edges of such forms. Other possibilities include, for example, corner regions which are devoid of pressure-sensitive adhesion on one or both sides.

In order to bring about a nondestructive re-release process of particularly sensitive substrates it is advantageous to use intermediate foam supports of low density and hence low splicing strengths. In combination with the abovementioned foam materials it is possible to use grip tabs with a wide variety of geometries without observing marked damage to, for example, coated woodchip wallpaper. In the case of polyolefin foam materials having densities of more than about 67 kg/M$^3$, specific forms of grip tab are preferred for residueless release even from sensitive substrates. In accordance with the invention, with rectangular adhesive strip geometries it is possible in particular to utilize:

Corner regions devoid of pressure-sensitive adhesion on one side, with adjacent or opposite corners on opposing adhesive strip surfaces being rendered devoid of pressure-sensitive adhesion.

Corner or edge regions devoid of pressure-sensitive adhesion on both sides, where the foam materials used are cut in the grip tab region parallel to the foam surface, approximately central in the foam.

Production

Adhesive tapes according to the invention can be produced by solvent coating, cold or hot lamination and by melt coating of the foam materials that are to be used. For layer thicknesses > about 75 µm, lamination or melt coating is generally preferred on economic grounds. The working of the foam-containing backings by, for example, perforation, cutting or punching can be carried out by means of the customary techniques known to the skilled worker, for example mechanically by means of cutting with a blade, using a rotary punch, using perforation knives, or thermally, for example by laser perforation. This working can be practised either on the foam-containing backing itself or on the material coated on one side with pressure-sensitive adhesive composition.

Test Methods

Tip-shear Strength

To determine the tip-shear strength, the adhesive film to be tested is bonded centrally to a highly polished square steel plate measuring 40 mm*40 mm*3 mm (height*width*thickness). On its back the steel plate is provided centrally with a 10 cm long steel rod which sits vertically on the surface of the plate. The test specimens obtained are bonded to the test substrate with a force of 100 N (press-on time=5 s) and are left in the unloaded state for 5 minutes. After setting the chosen tip-shear load by suspending a weight (lever arm and mass of the weight are selectable), the time taken for the bond to fail is measured (test climate=standard climate: T=23° C.; atmospheric humidity=50±5%).

Torsional (twisting) Strength (=determination of the torque required to release the adhesive bond)

In order to determine the torque required to release the adhesive bond by means of torsion, the adhesive film to be tested is bonded to a highly polished rectangular steel plate measuring 250 mm*40 mm*3 mm (length*width*thickness) in such a way that the centre of gravity of the strip of adhesive tape is located on an opening in the steel plate which is circular, has a diameter of 3.1 mm and is made centrally at a distance of 50 mm from one short end of the plate. The test specimen obtained is bonded with a force of 100 N to a second steel plate measuring 50 mm*50 mm*3 mm (length*width*thickness) (press-on time=5 s) in such a way that a circular steel pin with a diameter of 3 mm in the second plate projects into the circular aperture, of diameter 3.1 mm, in the first plate. In order to calculate the torque required to release the adhesive bond, the maximum force is determined which is measured on the rectangular steel plate at a distance of 200 mm from the fulcrum in the course of twisting. The parameters indicated are the torque required to cleave the adhesive bond and the type of fracture (test climate=standard climate: T=23 C.; atmospheric humidity= 50±5%; conditioning time min. 15 minutes).

Investigation into nondestructive and residueless re-release by twisting the bonded article from the bond substrate and then releasing the adhesive tape halves by stretching them essentially in the bond plane.

Assessment of the force to be employed for the twisting process in the course of releasing a Power-Strip System Hook a) Polystyrene/Steel Bond In order to assess the possibility for residueless re-release from solid substrates, the adhesive film to be tested, measuring 40 mm*20 mm (length*width) is bonded centrally to a highly polished square steel plate measuring 100 mm*100 mm*3 mm (height*width*thickness). In a second step, a baseplate of the tesa Power-Strips System Hooks is applied over the entire area to the adhesive strips that are to be tested, and the bond assembly is subjected for 5 seconds to a press-on force of 100 N. Then a hook body of the "arcade" form fitting the tesa Power-Strips System Hook (order number 58011) is mounted on the baseplate. After a conditioning time of at least 15 minutes at RT, the adhesive bond is released by twisting the hook. The parameters assessed are the type of fracture, the force (qualitative) required to cleave the adhesive bond, and the possibility of residueless re-release of the adhesive tape residues.

b) Bonding of Polystyrene Plates to Coated Woodchip Wallpaper

The samples are prepared as in a). The parameters assessed are the type of fracture, the possibility of residueless re-release of the adhesive tape residues from both substrates, and the presence and nature of any damage to the coated woodchip wallpaper (wallpaper: Erfurt Kornung 52; colour: Herbol Zenit LG; wallpaper bonded to chipboard).

Investigating Residueless Re-release by Levering the Bonded Article from the Bond Substrate In order to determine the force to be employed to cleave an adhesive bond, the adhesive tape strip under test is bonded centrally to the top end of a 200 mm*200 mm*20 mm (width*height*thickness) beechwood panel coated with an acrylic varnish in such a way that the self-adhesive tape adjoins the top edge of the wooden substrate. A coated beechwood rod measuring 200 mm*40 mm*20 mm (length*width*thickness) is bonded flush to the beechwood panel with a press-on force of 100 N. The parameters detected are the force required to cleave the adhesive bond, the type of fracture, and the possibility of residueless re-release of the adhesive tape residues (test climate= standard climate: T=23 C.; atmospheric humidity=50±5%; conditioning time min. 15 minutes).

Investigating Residueless Re-release by Peeling the Bonded Article from the Bond Substrate To determine the force to be employed to peel away an adhesive bond, the adhesive tape strip to be investigated is bonded to a highly polished square steel plate measuring 100 mm*100 mm*3 mm (height*width*thickness). In a second step, a 50 μm thick aluminium foil is bonded to the second side of the adhesive tape strip with a press-on force of 100 N (press-on time=5 s). The aluminium foil is subsequently peeled off at an angle of 90° to the bond plane at a rate of 300 mm/min. The parameters detected are the type of fracture, and the peel force as a function of the peel path (test climate=standard climate: T=23 C.; atmospheric humidity= 50±5%; conditioning time min. 15 minutes).

EXAMPLE 1

A pressure-sensitive adhesive composition consisting of 100 parts of SIS block copolymer (Vector 4211, Exxon), 100 parts of a penta ester of partially hydrogenated rosin (Foralyn 110, Hercules) and 1 part of a primary antioxidant (Irganox 1010, Ciba Additive) {=formulation 1} are applied by cold lamination to both sides of the foam materials listed below. For this purpose the foam material chosen is placed on the pressure-sensitive adhesive, which is on siliconized release paper, and then is rolled on five times under a pressure of 50 N using a 25 cm wide rubber-coated steel roller. The resulting intermediate product is coated with pressure-sensitive adhesive on the second side in an identical manner. Sufficient anchorage of the pressure-sensitive adhesive compositions to the foam is achieved by corona-treating both sides of the foam materials beforehand (pretreatment output about 40 Wmin/m$^2$). Tests are carried out after conditioning the resulting samples for 24 hours in a climatically controlled chamber (50% relative humidity, T=RT=23° C.). The test specimens (adhesive films) investigated measured 40 mm*20 mm (length*width), and were obtained by punching. The parameter determined was the torque for releasing the adhesive bond. A test was also carried out as to whether it is possible to achieve residueless re-release by stretching the adhesive tape residues parallel to the bond substrates. The resulting properties are as follows:

| Sample designation | Foam material trade name | Foam material type | Producer/ supplier |
|---|---|---|---|
| 01-01 | Alveolit TA 1501 | PE, crosslinked | Alveo AG |
| 01-02 | Alveolit TA 1501.5 | PE, crosslinked | Alveo AG |
| 01-03 | Alveolit TA 1502 | PE, crosslinked | Alveo AG |

| Sample designation | Foam thickness in μm | Density in kg/m$^3$ | Amount of adhesive applied sides A//B | Adhesive formulation |
|---|---|---|---|---|
| 01-01 | 1000 | 67 | 300//300 g/m$^2$ | {1} |
| 01-02 | 1500 | 67 | 300//300 g/m$^2$ | {1} |
| 01-03 | 2000 | 67 | 300//300 g/m$^2$ | {1} |

| Sample designation | Torque for cleaving the adhesive bond steel//steel | Does foam cleave? | Can residues be stripped from both sides of steel substrates without residue? | Tip-shear strength steel//steel* |
|---|---|---|---|---|
| 01-01 | 2.6 Nm | yes, cohesively | yes | >30 days |
| 01-02 | 2.3 Nm | yes, cohesively | yes | >30 days |
| 01-03 | 2.6 Nm | yes, cohesively | yes | >30 days |

*Lever arm = 2 cm;
force = 5 N;
T = 23° C.;
measurement terminated after 30 days All of the adhesive tape samples make it possible to obtain bonds which have high tip-shear strengths. They are therefore suitable for use, for example, in self-adhesive hooks. On twisting, cohesive cleavage of the foam backings is observed in all cases. The adhesive tape halves which remain on the two steel substrates can be released subsequently without residue by stretching essentially in the bond plane. To do this the respective adhesive tape half is grasped at one of its corners, and is released over a few mm in order to allow the adhesive tapes to be held securely between thumb and forefinger. Subsequently, the adhesive tape halves can easily be released without residue by stretching essentially in the bond plane. In the range of thicknesses investigated, it was not possible to detect any significant effect of the thickness of the foam materials used on the results of the experiment.

EXAMPLE 2a

In accordance with Ex. 1, three ethylene-vinyl acetate copolymer-containing foam materials with different densities, and three foam materials with different vinyl acetate contents, are investigated. The test specimens used (adhesive films) had dimensions of 40 mm*20 mm (length*width) and were obtained by punching. The resulting properties are as follows:

| Sample designation | Foam material trade name | Foam material type | Producer/ supplier |
| --- | --- | --- | --- |
| 02-01 | Alveolit TEE 1002 | EVAc, crosslinked | Alveo AG |
| 02-02 | Alveolit TEE 1501.5 | EVAc, crosslinked | Alveo AG |
| 02-03 | Alveolit TEE 3002 | EVAc, crosslinked | Alveo AG |
| 02-04 | Alveolit TA 1501.5 | FE, crosslinked | Alveo AG |
| 02-05 | Alveolit TE 1501.5 | EVAc, crosslinked | Alveo AG |

| Sample designation | Foam thickness in μm | Density in kg/m$^3$ | Amount of adhesive applied sides A//B | Adhesive formulation |
| --- | --- | --- | --- | --- |
| 02-01 | 2000 | 100 | 300//300 g/m$^2$ | {1} |
| 02-02 | 1500 | 67 | 300//300 g/m$^2$ | {1} |
| 02-03 | 2000 | 33 | 300//300 g/m$^2$ | {1} |
| 02-04 | 1500 | 67 | 300//300 g/m$^2$ | {1} |
| 02-05 | 1500 | 67 | 300//300 g/m$^2$ | {1} |

| Sample designation | Torque for cleaving the adhesive bond | Does foam cleave? | Can residues be stripped from both sides of steel substrates without residue? | Tip-shear strength steel//steel* |
| --- | --- | --- | --- | --- |
| 02-01 | 4.0 Nm | yes | yes | >30 days |
| 02-02 | 3.0 Nm | yes | yes | >30 days |
| 02-03 | 1.4 Nm | yes | yes | >30 days |
| 02-04 | 2.3 Nm | yes | yes | >30 days |
| 02-05 | 2.5 Nm | yes | yes | >30 days |

*Lever arm = 2 cm;
force = 5 N;
T = 23° C.;
measurement terminated after 30 days In analogy to the experiments in Ex. 1, all of the samples, when twisted, exhibit cohesive cleavage of the foam backings. The adhesive tape halves which have remained on the two substrates can subsequently, as in Ex. 1, be released from both substrates without residue by stretching essentially in the bond plane. A reduction in the density of the foams used has a marked effect on the forces required to cleave the adhesive film. An increase in the EVAc content of the foam materials used (Alveolit TA: EVAc content <0.5%; Alveolit TE: EVAc content about 7%; Alveolit TEE: EVAc content about 14%, according to information from the manufacturer) likewise has a significant effect on the forces required to cleave the adhesive films. As a result of the high bond strength (tip-shear holdout times) the above adhesive tapes are likewise highly suitable for use in self-adhesive hooks, for example.

EXAMPLE 2b

An uncoated beechwood panel measuring 152 mm*102 mm*6 mm, on whose front side a postcard measuring 150 mm*100 mm (width*height) has been applied, is bonded to an acrylic-coated wooden door with an adhesive strip of sample designation 02-04 (see Ex. 2a; dimensions of the adhesive strip=20 mm*40 mm (width*height)). For this purpose the adhesive strip, following the removal of a first release paper, is fixed centrally to the reverse side of the beechwood panel in such a way that the long side of the adhesive strip extends horizontally. After removing the second release paper, the beechwood panel is bonded to the door with firm manual pressure. The adhesive bond can be released by twisting. In the course of such release, the adhesive strip used cleaves cohesively in the foam. Residues of adhesive tape can be released from both bond substrates in one piece without residue or destruction by stretching in the bond planes.—The experiment is repeated with an adhesive strip whose pressure-sensitive adhesive surface has been rendered inert in opposite corner regions, in each case on one side, by applying in each case a triangular polyester film (Hostaphan RN 25; from Hoechst) which is 25 μm thick and measures 4 mm*4 mm*5.7 mm. When the beechwood panel is twisted, the adhesive tape strip cleaves cohesively in the foam material. The residues of adhesive tape which remain on the respective substrates can be released easily from both substrates, starting from the integrated grip tab regions, by stretching essentially in the bond plane.

EXAMPLE 3

In analogy to Ex. 1, a polyethylene foam of density 67 kg/m$^3$ with a thickness of 1.5 mm (Alveolit TA 1501.5) is coated with the pressure-sensitive adhesive composition of formulation 1 in various thicknesses. The test specimens (adhesive films) investigated had been obtained by punching and measured 40 mm*20 mm (length*width). The resulting product properties are as follows:

| Sample designation | Foam material trade name | Foam material type | Producer/ supplier |
| --- | --- | --- | --- |
| 03-01 | Alveolit TA 1501.5 | PE, crosslinked | Alveo AG |
| 03-02 | Alveolit TA 1501.5 | PE, crosslinked | Alveo AG |
| 03-03 | Alveolit TA 1501.5 | PE, crosslinked | Alveo AG |
| 03-04 | Alveolit TA 1501.5 | PE, crosslinked | Alveo AG |
| 03-05 | Alveolit TA 1501.5 | PE, crosslinked | Alveo AG |

| Sample designation | Foam thickness in μm | Density in kg/m$^3$ | Amount of adhesive applied sides A//B | Adhesive formulation |
| --- | --- | --- | --- | --- |
| 03-01 | 1500 | 67 | 50//50 g/m$^2$ | {1} |
| 03-02 | 1500 | 67 | 100//100 g/m$^2$ | {1} |
| 03-03 | 1500 | 67 | 200//200 g/m$^2$ | {1} |
| 03-04 | 1500 | 67 | 300//300 g/m$^2$ | {1} |
| 03-05 | 1500 | 67 | 500//500 g/m$^2$ | {1} |

| Sample designation | Torque for cleaving the adhesive bond | Does foam cleave? | Can residues be stripped from both sides of steel substrates without residue? | Tip-shear strength steel//steel* |
| --- | --- | --- | --- | --- |
| 02-01 | 2.2 Nm | yes | no | >30 days |
| 02-02 | 2.4 Nm | yes | no | >30 days |
| 02-03 | 2.3 Nm | yes | yes | >30 days |

-continued

| | | | | |
|---|---|---|---|---|
| 02-04 | 2.3 Nm | yes | yes | >30 days |
| 02-05 | 2.5 Nm | yes | yes | >30 days |

*Lever arm = 2 cm;
force = 5 N;
T = 23° C.;
measurement terminated after 30 days As with the experiments in Ex. 1, cohesive cleavage of the foam backings is observed on twisting with all of the samples. The adhesive tape halves which have remained on the two substrates can be re-released subsequently without residue by stretching essentially in the bond plane in the case where the amounts of adhesive composition applied were >100 g/m². In contrast, residueless release is unsuccessful in the case of amounts applied of <100 g/m² on both sides, owing to inadequate tear strengths of the pressure-sensitive adhesive compositions.

EXAMPLE 4

In accordance with Ex. 1, five polyethylene foams of varying density, one PVC foam and one polyurethane foam were tested comparatively. Test specimens were produced (adhesive films) which measured 40 mm*20 mm (length*width) and were obtained by punching. The resulting properties are as follows:

| Sample designation | Foam material trade name | Foam material type | Producer/ supplier |
|---|---|---|---|
| 04-01 | Alveolit TA 0402 | PE, crosslinked | Alveo AG |
| 04-02 | Alveolit TA 0501.5 | PE, crosslinked | Alveo AG |
| 04-03 | Alveolit TA 1001.6 | PE, crosslinked | Alveo AG |
| 04-04 | Alveolit TA 1501.5 | PE, crosslinked | Alveo AG |
| 04-05 | Alveolit TA 3002 | PE, crosslinked | Alveo AG |
| 04-06 | PVCW-Schaumstoff D.2 weiß | PVC-W | Pegulan |
| 04-07 | Inducon S 260 - 1.5 mm | PU | Mayser |

| Sample designation | Foam thickness in μm | Density in kg/m³ | Amount of adhesive applied sides A//B | Adhesive formulation |
|---|---|---|---|---|
| 04-01 | 2000 | 250 | 300//300 g/m² | {1} |
| 04-02 | 1500 | 185 | 300//300 g/m² | {1} |
| 04-03 | 1600 | 95 | 300//300 g/m² | {1} |
| 04-04 | 1500 | 67 | 300//300 g/m² | {1} |
| 04-05 | 2000 | 33 | 300//300 g/m² | {1} |
| 04-06 | 2000 | 200 | 300//300 g/m² | {1} |
| 04-07 | 1700 | 390 | 300//300 g/m² | {1} |

| Sample designation | Torque for cleaving the adhesive bond | Does foam cleave? | Can residues be stripped from both sides of steel substrates without residue? |
|---|---|---|---|
| 04-01 | 5.0 Nm | no | no |
| 04-02 | 5.2 Nm | no | no |
| 04-03 | 3.9 Nm | yes | yes |
| 04-04 | 2.3 Nm | yes | yes |
| 04-05 | 0.8 Nm | yes | yes |
| 04-06 | 4.0 Nm | yes | yes |
| 04-07 | 3.8 Nm | yes | yes |

In the present series of experiments, in the course of the release process, as in the case of the examples in the experiments described above, adhesive tapes which require a torque of about 4 Nm to release the adhesive bond cleave cohesively in the foam material. The adhesive tape halves which have remained on the two substrates can subsequently be released without residue, as in Ex. 1, by stretching essentially in the bond plane. Samples which have torques of ≥ about 5 Nm could not be released in this way under the specified conditions.

EXAMPLE 5

For the adhesive tape samples listed below, which are produced in accordance with Ex. 1, the ease of residueless re-release is determined comparatively for bonds of polystyrene plates to steel and for bonds of polystyrene plates to coated woodchip wallpaper. The test specimens used (adhesive films) measure 40 mm*20 mm (length*width). Bonds are released by twisting the polystyrene plates. The experimental results are as follows:

| Sample designation | Foam material trade name | Foam material type | Producer/ supplier |
|---|---|---|---|
| 05-04-05 | Alveolit TA 3002 | PE, crosslinked | Alveo AG |
| 05-02-03 | Alveolit TEE 3002 | EVAc, crosslinked | Alveo AG |
| 05-04-04 | Alveolit TA 1501.5 | PE, crosslinked | Alveo AG |
| 05-02-05 | Alveolit TE 1501.5 | EVAc, crosslinked | Alveo AG |
| 05-02-02 | Alveolit TEE 1501.5 | EVAc, crosslinked | Alveo AG |
| 05-04-03 | Alveolit TA 1001.6 | PE, crosslinked | Alveo AG |
| 05-02-01 | Alveolit TEE 1002 | EVAc, crosslinked | Alveo AG |
| 05-04-02 | Alveolit TA 0501.5 | PE, crosslinked | Alveo AG |
| 05 04-01 | Alveolit TA 0402 | PE, crosslinked | Alveo AG |

| Sample designation | Foam thickness in μm | Density in kg/m³ | Amount of adhesive applied sides A//B | Adhesive formulation |
|---|---|---|---|---|
| 05-04-05 | 2000 | 33 | 300//300 g/m² | {1} |
| 05-02-03 | 2000 | 33 | 300//300 g/m² | {1} |
| 05-04-04 | 1500 | 67 | 300//300 g/m² | {1} |
| 05-02-05 | 1500 | 67 | 300//300 g/m² | {1} |
| 05-02-02 | 1500 | 67 | 300//300 g/m² | {1} |
| 05-04-03 | 1600 | 95 | 300//300 g/m² | {1} |
| 05-02-01 | 2000 | 100 | 300//300 g/m² | {1} |
| 05-04-02 | 1500 | 185 | 300//300 g/m² | {1} |
| 05-04-01 | 2000 | 250 | 300//300 g/m² | {1} |

| Sample designation | Torque for cleaving the adhesive bond (steel// polystyrene) | Does foam cleave? | Can residues be stripped from both sides of steel substrates without residue? (polystyrene-steel) | Ease of releasing (cleaving) the steel/ polystyrene bond |
|---|---|---|---|---|
| 05-04-05 | 0.8 Nm | yes | yes | very easy |
| 05-02-03 | 1.4 Nm | yes | yes | very easy |
| 05-04-04 | 2.3 Nm | yes | yes | easy |
| 05-02-05 | 2 5 Nm | yes | yes | easy |
| 05-02-02 | 3.0 Nm | yes | yes | easy |
| 05-04-03 | 3.9 Nm | yes | yes | hard |
| 05-02-01 | 4.0 Nm | yes | yes | hard |
| 05-04-02 | 5.2 Nm | no | no | very hard |
| 05-04-01 | 5.0 Nm | no | no | very hard |

| Sample designation | Torque for cleaving the adhesive bond (polystyrene//coated woodchips) | Can residues be stripped from both sides without residue ? (polystyrene//coated woodchips) |
|---|---|---|
| 05-04-05 | 0.8 Nm | yes |
| 05-02-03 | 1.4 Nm | yes |
| 05-04-04 | 2.6 Nm | yes |
| 05-02-05 | not determined | yes |
| 05-02-02 | 3.0 Nm | yes |
| 05-04-03 | 3.6 Nm | slight removal of paint |
| 05-02-01 | 4.0 Nm | slight removal of paint |
| 05-04-02 | 4.0 Nm | two-dimensional cleavage of the wallpaper |
| 05-04-01 | 4.0 Nm | two-dimensional cleavage of the wallpaper |

Up until torques of about 4 Nm, in the bond of polystyrene to steel, two-dimensional cohesive cleavage of the foam intermediate support is observed. Adhesive tape residues can be released subsequently from both bond substrates without residue, as in Ex. 1. Up to torques of about 3 Nm, slight cleavage of the bond is perceived subjectively, while from a bond-releasing torque of about 5 Nm release appears difficult. At twisting moments of ≦about 3 Nm the bonds of polystyrene plates to coated woodchip wallpaper can be released without residue and without damage.

EXAMPLE 6

An ethylene-vinyl acetate-containing foam material of density 100 kg/m³ with a thickness of 1.5 mm is coated, as in Ex. 1, with a pressure-sensitive adhesive composition of 100 parts of a penta ester of partially hydrogenated rosin (Pentalyn H-E; from Hercules), 80 parts of SIS block copolymer (Kraton D 1125; from Shell), 20 parts of SBS block copolymer (Kraton D 1102; from Shell) and 1 part of a primary antioxidant (Irganox 1010; from Ciba Additive {=formulation 2}. The specimens investigated are circular punched specimens varying in diameter. The parameter determined is the torque for releasing the adhesive bond. A test is also carried out as to whether it is possible to achieve residueless re-release by stretching the residues of adhesive tape parallel to the bond substrates. The resulting properties are as follows:

In the entire range of the bond area investigated, the bonds performed can be re-released without residue by twisting and subsequent stretching of the adhesive tape halves which have remained on the bond substrates, essentially in the bond plane. Adhesive tape strips of relatively large surface area make it possible to bond articles which place high requirements on the shear strength and tip-shear strength of the adhesive bond. Bonds which can be re-released without residue and non-destructively are likewise possible on sensitive substrates, such as, for example, on coated woodchip wallpaper (Ex. 06-06).

EXAMPLE 7

In accordance with Ex. 6, Alveolit TEE 1001.5 is coated on both sides with 300 g/m² of an adhesive composition based on formulation {2}. The specimens tested are rectangular punched specimens varying in dimensions. The resulting properties are as follows:

| Sample designation | Foam material trade name | Foam material type | Producer/ supplier | Area of the adhesive strip |
|---|---|---|---|---|
| 06-01 | Alveolit TEE 1001.5 | EVAc, crosslinked | Alveo AG | 230 mm² |
| 06-02 | Alveolit TEE 1001.5 | EVAc, crosslinked | Alveo AG | 350 mm² |
| 06-03 | Alveolit TEE 1001.5 | EVAc, crosslinked | Alveo AG | 620 mm² |
| 06-04 | Alveolit TEE 1001 5 | EVAc, crosslinked | Alveo AG | 800 mm² |
| 06-05 | Alveolit TEE 1001.5 | EVAc, crosslinked | Alveo AG | 1260 mm² |
| 06-06 | Alveolit TA 3002 | PE, crosslinked | Alveo AG | 800 mm² |

| Sample designation | Foam thickness in μm | Density in kg/m³ | Amount of adhesive applied sides A//B | Adhesive formulation |
|---|---|---|---|---|
| 06-01 | 1500 | 100 | 300//300 g/m² | {2} |
| 06-02 | 1500 | 100 | 300//300 g/m² | {2} |
| 06-03 | 1500 | 100 | 300//300 g/m² | {2} |
| 06-04 | 1500 | 100 | 300//300 g/m² | {2} |
| 06-05 | 1500 | 100 | 300//300 g/m² | {2} |
| 06-06 | 2000 | 33 | 300//300 g/m² | {2} |

| Sample designation | Torque for cleaving the adhesive bond steel//steel | Does foam cleave? | Can residues be stripped from both sides of steel substrates? | Tip-shear strength steel//steel* |
|---|---|---|---|---|
| 06-01 | 0.4 Nm | yes | yes | |
| 06-02 | 1.0 Nm | yes | yes | |
| 06-03 | 2.4 Nm | yes | yes | |
| 06-04 | 3.2 Nm | yes | yes | |
| 06-05 | 6.0 Nm | yes | yes | >21 days |

| Sample designation | Torque for cleaving the adhesive bond steel//coated woodchip wallpaper | Does foam cleave? | Can residues be stripped from both sides of woodchip wallpaper without residue |
|---|---|---|---|
| 06-06 | 0.8 Nm | yes | yes |

*Lever arm = 9 cm;
load = 20 N;
T = 23° C.;
measurement terminated after 21 days

| Sample designation | Foam material trade name | Foam material type | Producer/ supplier | Length//width//area of the adhesive strip |
|---|---|---|---|---|
| 07-01 | Alveolit TEE 1001.5 | EVAc, crosslinked | Alveo AG | 40 mm//20 mm// 800 mm$^2$ |
| 07-02 | Alveolit TEE 1001.5 | EVAc, crosslinked | Alveo AG | 75 mm//11 mm// 825 mm$^2$ |

| Sample designation | Foam thickness in μm | Density in kg/m$^3$ | Amount of adhesive applied sides A//B | Adhesive formulation |
|---|---|---|---|---|
| 07-01 | 1500 | 100 | 300//300 g/m$^2$ | {2} |
| 07-02 | 1500 | 100 | 300//300 g/m$^2$ | {2} |

| Sample designation | Torque for cleaving the adhesive bond steel//steel | Does foam cleave? | Can residues be stripped from both sides of steel substrates without residue? |
|---|---|---|---|
| 07-01 | 3.0 Nm | yes | yes |
| 07-02 | 5.9 Nm | yes | yes |

By varying the geometry of the adhesive strips it is possible to control the twisting moment required to release the adhesive bond within a wide range.

EXAMPLE 8

In accordance with Ex. 6, Alveolit TEE 1001.5 is coated on both sides with 300 g/m$^2$ of an adhesive composition of formulation {2}. Before being laminated with the pressure-sensitive adhesive compositions, the foam material used is subjected to perforation punching, the foam being punched through in the production direction and vertically to the production direction at a distance of 1.5 mm. This operation produces 8 mm long incisions, which are interrupted by 2 mm long regions without through-punching, in the foam material. The resulting product properties are as follows:

EXAMPLE 9

To facilitate the process of release by stretching essentially in the bond plane, regions devoid of pressure-sensitive adhesive are integrated into the adhesive strips, these regions subsequently being suitable as grip tabs starting from which it is possible to carry out the release process advantageously. For this purpose, in accordance with Ex. 1, adhesive strips measuring 50 mm*20 mm are produced which subsequently acquire a non-adhesive grip tab region at one strip end on both sides by the lamination of 12 mm*20 mm polyester foam strips (Hostaphan RN 25; from Hoechst) which are 25 μm thick. Using the adhesive tape strips produced in this way it is possible to realize bonds as in Ex. 1 to 3. Following the release of a steel//steel adhesive bond by twisting, the foam material cleaves cohesively within the

| Sample designation | Foam material trade name | Foam material type | Producer supplier | Is foam material punched through |
|---|---|---|---|---|
| 08-01 | Alveolit TEE 1001.5 | EVAc, crosslinked | Alveo AG | no |
| 08-02 | Alveolit TEE 1001.5 | EVAc, crosslinked | Alveo AG | yes |

| Sample designation | Foam thickness in μm | Density in kg/m$^3$ | Amount of adhesive applied sides A//B | Adhesive formulation |
|---|---|---|---|---|
| 08-01 | 1500 | 100 | 300//300 g/m$^2$ | {2} |
| 08-02 | 1500 | 100 | 300//300 g/m$^2$ | {2} |

| Sample designation | Torque for cleaving the adhesive bond steel//steel | Does foam cleave? | Can residues be stripped from both sides of steel substrates? without residue | Tip-shear strength steel//steel* |
|---|---|---|---|---|
| 07-01 | 4.0 Nm | yes | yes | >30 days |
| 07-02 | 3.1 Nm | yes | yes | >30 days |

*Lever arm = 2 cm;
load = 5 N;
T = 23° C.;
measurement terminated after 30 days

By using perforated foams it is possible to exert targeted control over the twisting moment, without evidence in the present example of a marked reduction in the bond strength.

foam material in the grip tab region when the steel plates are pulled apart. Starting from the non-pressure-sensitive-adhesive grip tab regions the residues of adhesive tape can be released from both steel substrates without residue by stretching essentially in the bond plane.

EXAMPLE 10

Adhesive strips are produced with a grip tab region at the end which is devoid of pressure-sensitive adhesion (form and size as in Ex. 9). The subject of testing is the residueless non-destructive re-release of polystyrene plates (baseplates of the tesa Power Strips System-Haken) which have been bonded to coated woodchip wallpapers. The parameter determined is the torque for releasing the adhesive bond. Testing is also carried out as to whether residueless re-release is possible by stretching the residues of adhesive tape parallel to the bond substrates. The resulting properties are as follows:

cutting of the foam material parallel to the foam surface in the region of the grip tabs (incisions extending approximately centrally in the foam material) it is possible to employ even foam intermediate backings of higher density and thus higher intrinsic strength for correspondingly releasable bonds (releasable without residue or destruction) on sensitive surfaces.

EXAMPLE 11a

In accordance with Ex. 2b, adhesive strips measuring 40 mm*20 mm are provided with non-adhesive grip tab regions on one side (opposite corners of the adhesive film are rendered inert). A measurement is made of the force required to release the adhesive bond (wood//wood bond) by lever-

| Sample designation | Foam material trade name | Foam material type | Producer/ supplier | With grip tab region at the end |
|---|---|---|---|---|
| 10-01 | Alveolit TA 1502 | PE, crosslinked | Alveo AG | yes 12 mm* 20 mm |
| 10-02 | Alveolit TA 3002 | PE, crosslinked | Alveo AG | yes 12 mm* 20 mm |
| 10-03 | Alveolit TA 1502 | PE, crosslinked | Alveo AG | yes 12 mm* 20 mm** |
| 10-04 | Alveolit TEE 1501.5 | EVAc, crosslinked | Alveo AG | yes 12 mm* 20 mm** |

| Sample designation | Foam thickness in μm | Density in kg/m$^3$ | Amount of adhesive applied sides A//B | Adhesive formulation |
|---|---|---|---|---|
| 10-01 | 2000 | 67 | 300//300 gm$^2$ | {1} |
| 10-02 | 2000 | 33 | 300//300 gm$^2$ | {1} |
| 10-03 | 2000 | 67 | 300//300 gm$^2$ | {1} |
| 10-04 | 1500 | 67 | 300//300 gm$^2$ | {1} |

| Sample designation | Torque for cleaving the adhesive bond steel//steel | Does foam cleave? | Can residues be stripped from both sides without residue polystyrene//coated woodchip |
|---|---|---|---|
| 10-01 | 2.0 Nm | yes | no* |
| 10-02 | 1.2 Nm | yes | yes |
| 10-03 | 2.1 Nm | yes | yes |
| 10-04 | 2.9 Nm | yes | yes |

*slight removal of paint from the coated woodchip wallpaper; partial cleavage of the wallpaper
**foam material separated approximately centrally in the grip tab region in the plane of the foam material Foam intermediate supports of low density and hence low intrinsic strength make it possible to produce double-sidedly pressure-sensitive self-adhesive tapes which can be re-released without residue and destruction even from sensitive substrates such as, for example, coated woodchip wallpapers (Ex. 10-02). If it is necessary to use a foam backing with a higher density, then by two-dimensional age. A comparative investigation is conducted with adhesive strips which utilize foam materials that are perforated vertically to the foam surface, adhesive strips which are perforated obliquely at an angle of about 45° to the foam surface, and adhesive strips whose foam intermediate support has not been perforated. The results obtained are as follows:

| Sample designation | Foam material trade name | Foam material type | Producer/ supplier | With grip tab in the edge region? |
|---|---|---|---|---|
| 11-01 | Alveolit TA 1001.5 | PE, crosslinked | Alveo AG | yes, on one side, 4* 4* 5.6 mm |
| 11-01a | Alveolit TA 1001.5 | PE, crosslinked | Alveo AG | yes, on one side, 4* 4* 5.6 mm |
| 11-02 | Alveolit TA 1001.5 | PE, crosslinked | Alveo AG | yes, on one side, 4* 4* 5.6 mm |
| 11-03 | Alveolit TA 1001.5 | PE, crosslinked | Alveo AG | yes, on one side, 4* 4* 5.6 mm |
| 11-04 | Alveolit TA 1501.5 | PE, crosslinked | Alveo AG | yes, on one side, 4* 4* 5.6 mm |
| 11-04 | Alveolit TA 3002 | PE, crosslinked | Alveo AG | yes, on one side, 4* 4* 5.6 mm |

-continued

| Sample designation | Foam thickness in μm | Density in kg/m³ | Amount of adhesive applied sides A//B | Adhesive formulation | Bond direction | Adhesive strips**** |
|---|---|---|---|---|---|---|
| 11-01 | 1500 | 100 | 300//300 g/m² | {1} | vertical | |
| 11-01a | 1500 | 100 | 300//300 g/m² | {1} | horizontal | |
| 11-02 | 1500 | 100 | 300//300 g/m² | {1} | vertical | |
| 11-03 | 1500 | 100 | 300//300 g/m² | {1} | vertical | |
| 11-04 | 1500 | 67 | 300//300 g/m² | {1} | vertical | |
| 11-05 | 2000 | 33 | 300//300 g/m² | {1} | vertical | |

| Sample designation | Force for cleaving the wood//wood adhesive bond* | Does foam cleave? | Can residues be stripped without residue from both sides? Wood//wood | Have foam backings been cut? |
|---|---|---|---|---|
| 11-01 | 35 N | yes | yes | no |
| 11-01a | 18 N | yes | yes | no |
| 11-02 | 27 N | yes | yes | yes** |
| 11-03 | 35 N | yes | yes | yes*** |
| 11-04 | 22 N | yes | yes | no |
| 11-05 | 10 N | yes | yes | no |

*lever arm = 200 mm
**foam material cut through completely in parallel lines at a uniform distance of 1.5 mm. Perforation angle = 45° to the foam surface. Incisions extending vertically with respect to the lever plane from below (bonded article and lever, respectively) to the top (wall side or fixed bond substrate).
***foam material cut through completely in parallel lines at a uniform distance of 1.5 mm. Perforation angle = 90° (vertical) to the foam surface. Incisions extending vertically to the lever plane.
****vertical bonding: adhesive strip width = 40 mm, adhesive strip height = 20 mm; horizontal bonding: adhesive strip width = 20 mm, adhesive strip height = 40 mm Under leverage, the adhesive strips investigated cleave cohesively in the foam material. Subsequently, it is possible to re-release the residues of adhesive tape without residue by stretching them in the bond plane starting from the integrated grip tab strips. Oblique incision of the foam materials used enables the release forces to be controlled in a targeted manner. As the density of the foam materials used falls, there is a considerable drop in the force required to cleave the adhesive bond.

EXAMPLE 11b

The beechwood panel from Ex. 2 provided on the front side with a postcard is provided on the reverse side with a pressure-sensitive adhesive strip as in Ex. 11a—sample 11-05, but with the dimensions 100 mm*15 mm (width*height). In this case, the adhesive strip is bonded on the reverse side and flush to the top end of the beechwood panel. Following the removal of the second cover paper, the beechwood panel is bonded to a coated wooden substrate under firm manual pressure. The bond produced in this way can be cleaved by levering off the picture starting from its underside. The residues of adhesive tape which have remained on both bond substrates can be released, starting from the grip tab regions which are integrated in both adhesive tape halves, without residue or destruction by stretching essentially in the bond plane.

EXAMPLE 12

Alveolit TA 1001.6, TA 1501.5 and 3002 are coated in accordance with Ex. 1 with a pressure-sensitive adhesive composition (formulation 1). The systems investigated are adhesive strips measuring 50 mm*20 mm with a grip tab region devoid of pressure-sensitive adhesion integrated in one corner on both sides. A measurement is made of the force required to cleave the adhesive bond by peeling off aluminium strips bonded to polished steel plates. The resulting properties are as follows:

| Sample designation | Foam material trade name | Foam material type | Producer/ supplier | With grip tab in the edge region? |
|---|---|---|---|---|
| 12-01 | Alveolit TA 1001.6 | PE, crosslinked | Alveo AG | at the end, 4* 4* 5.6 mm* |
| 12-02 | Alveolit TA 1501.5 | PE, crosslinked | Alveo AG | at the end, 4* 4* 5.6 mm* |
| 12-03 | Alveolit TA 3002 | PE, crosslinked | Alveo AG | at the end, 4* 4* 5.6 mm* |

| Sample designation | Foam thickness in μm | Density in kg/m³ | Amount of adhesive applied sides A//B | Adhesive formulation |
|---|---|---|---|---|
| 12-01 | 1600 | 100 | 300//300 g/m² | {1} |
| 12-02 | 1500 | 67 | 300//300 g/m² | {1} |
| 12-03 | 2000 | 33 | 300//300 g/m² | {1} |

-continued

| Sample designation | Force for cleaving the adhesive bond alu//steel initial tear force//tear propagation force | Does foam cleave? | Can residues be stripped without residue from both sides? |
|---|---|---|---|
| 12-01 | 20 N/cm//10 N/cm | yes | yes |
| 12-02 | 13 N/cm//9 N/cm | yes | yes |
| 12-03 | 4 N/cm//2 N/cm | yes | yes |

*on both sides in one edge

Peel forces pass through a maximum at the beginning of measurement (=initial tear force). When the aluminium foil is peeled from the steel substrate, adhesive strips cleave cohesively in the foam. Subsequently, residues of adhesive tape can be detached without residue from both bond substrates, starting from the integrated grip tab regions, by stretching essentially in the bond plane. By peeling, it is preferentially possible to re-release non-planar bonds without residue or damage.

What is claimed is:

1. A double-sided adhesive tape which can be released from a substrate to which it is adhered without leaving a residue on said substrate and without destruction of said substrate, said double-sided adhesive tape comprising:
    a) an intermediate support having a length and a width defining two opposite sides, which intermediate support cleaves along the entirety of its length and along the entirety of its width into two pieces when subjected to a torsional force, lever force and/or peel force; and
    b) pressure-sensitive adhesive composition coated on both sides of the intermediate support.

2. The double-sided adhesive tape according to claim 1, wherein the intermediate support comprises a foam-containing backing material.

3. The double-sided adhesive tape according to claim 2, wherein the foam-containing backing material comprises an optionally crosslinked polymer foam.

4. The double-sided adhesive tape according to claim 1, wherein the intermediate support comprises a foamed homopolymeric or copolymeric olefin.

5. The double-sided adhesive tape according to claim 4, wherein the foamed homopolymeric or copolymeric olefin comprises polyethylene or ethylene vinyl acetate.

6. The double-sided adhesive tape according to claim 1, wherein the intermediate support has a thickness of from 175 μm to 10 mm and a density of from 20 to 400 kg/m$^3$.

7. The double-sided adhesive tape according to claim 6, wherein the intermediate support has a thickness of from 250 μm to 3 mm and a density of from 25 to 250 kg/m$^3$.

8. The double-sided adhesive tape according to claim 1, wherein the pressure-sensitive adhesive composition on a first side of the intermediate support differs from the pressure-sensitive adhesive composition on a second side of the intermediate support.

9. The double-sided adhesive tape according to claim 8, wherein the pressure-sensitive adhesive composition on the first side of the intermediate support differs from the pressure-sensitive adhesive composition on the second side of the intermediate support in terms of its composition and/or its applied thickness.

10. The double-sided adhesive tape according to claim 1, wherein the pressure-sensitive adhesive composition is based on block copolymers.

11. The double-sided adhesive tape according to claim 1, further comprising an extensible film backing between one or both of the pressure-sensitive adhesive compositions and the intermediate support.

12. The double-sided adhesive tape according to claim 11, wherein the extensible film backing is based on acrylate or on rubber.

13. The double-sided adhesive tape according to claim 1, wherein individual adhesive tape sections comprise a non-adhesive grip tab.

14. The double-sided adhesive tape according to claim 1, wherein the intermediate support has been subjected to a pretreatment in order to reduce its mechanical strength.

15. The double-sided adhesive tape according to claim 14, wherein the pretreatment comprises making incisions in the intermediate support.

16. A method of forming a bond between a first substrate and a second substrate in such a way that the bond is not observable to a viewer of said substrates, and thereafter releasing said bond, said method comprising:
    a) providing a double-sided adhesive tape according to any one of claims 1–15.
    b) adhering a first side of said double-sided adhesive tape to said first substrate and adhering a second side of said double-sided adhesive tape to said second substrate in such a way that the bond formed between said first substrate and said second substrate is hidden from the view of a viewer of said substrates;
    c) subjecting the double-sided adhesive tape to a torsional force, lever force and/or peel force to cleave the intermediate support lengthwise and widthwise into two pieces, one of which pieces remains bonded to said first substrate, and one of which pieces remains bonded to said second substrate;
    d) pulling on the piece which remains bonded to said first substrate in the direction of the plane of the bond between said piece and said first substrate to release said piece from said first substrate; and
    e) pulling on the piece which remains bonded to said second substrate in the direction of the plane of the bond between said piece and said second substrate to release said piece from said second substrate.

17. A double-sided adhesive tape which can be released from a substrate to which it is adhered without leaving exposed adhesive on the substrate, said tape comprising:
    a) an intermediate support having a top surface and a bottom surface; and
    b) pressure-sensitive adhesive coatings on the top and bottom surfaces;
wherein the intermediate support is cleavable into two pieces along a surface that extends entirely between the top and bottom surfaces when the intermediate support is subjected to a torsional force, a lever force and/or a peel force, with each of the two pieces adjacent to only one of the adhesive coatings.

* * * * *